March 29, 1949.  D. O. MacDONALD ET AL  2,465,810
FLUID OPERATED CLUTCH MECHANISM
Original Filed Dec. 4, 1944
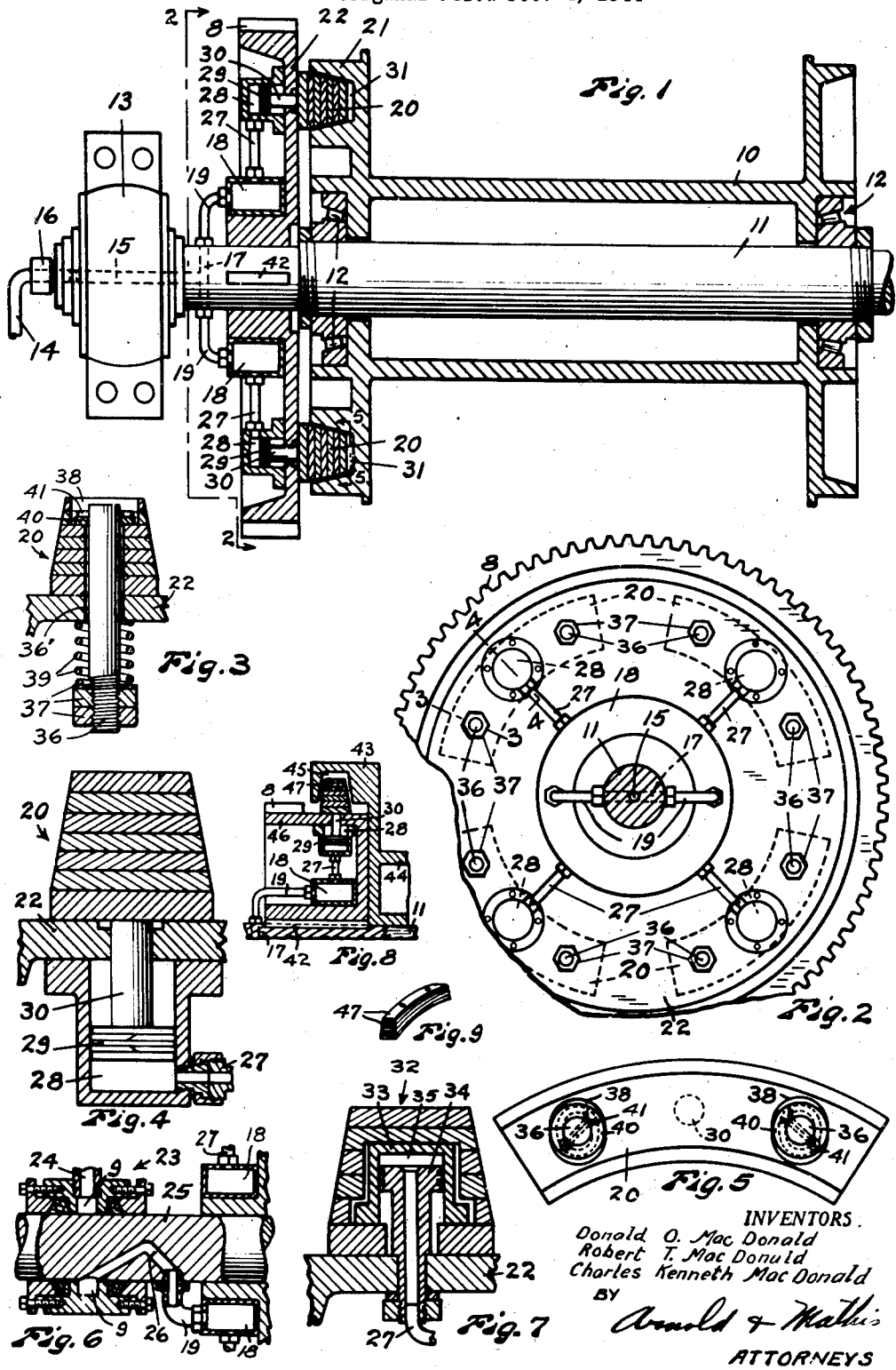
INVENTORS.
Donald O. Mac Donald
Robert T. Mac Donald
Charles Kenneth Mac Donald
BY
Arnold & Mathis
ATTORNEYS Patented Mar. 29, 1949

2,465,810

UNITED STATES PATENT OFFICE 2,465,810

FLUID OPERATED CLUTCH MECHANISM

Donald O. MacDonald, Robert T. MacDonald, and Charles Kenneth MacDonald, Port Angeles, Wash.

Substituted for application Serial No. 566,448, December 4, 1944. This application September 5, 1947, Serial No. 772,276. In Canada July 12, 1947

3 Claims. (Cl. 192—85)

This application is a substitute for our prior application Serial Number 566,448, filed December 4, 1944.

This invention relates to a clutch mechanism or a friction mechanism, which may be employed to gradually connect a rotating prime mover to a driven rotary load.

In the prior commercial art of clutches, it was common practice to provide two spaced face members (as either flat disc means or mating tapered or conical surfaces) and mounting one thereof for sliding movement longitudinally of its supporting shaft so that a longitudinal movable friction surface could be resiliently slid into frictional engagement with a longitudinally stationary matching cone or disc.

This prior art practice of sliding the entire cone or disc into engagement with a mating surface has had many shortcomings. For example, in the event of any inaccuracies in the alignment of the two engaging faces, there was provided frictional engagement only over a part of the surface areas of the clutch faces.

It is an object of our invention to provide two relatively longitudinally fixed and spaced clutch members, one of which mounts a plurality of friction surfaces which are mounted for movement toward and away from the other clutch member.

It is a further object of our invention to provide a plurality of friction engaging clutch blocks each of which is separately mounted for movement into and out of engaging relation by means of fluid pressure means.

It is a further object of the invention to provide a driven drum, as a hoisting drum, which may be fixed longitudinally on a shaft so the same can be supported by non-friction bearings, as roller thrust bearings, and provide clutch means engageable with a clutch face carried by such drum. Such structure is to be distinguished from prior art practices where it was common to mount a hoisting drum for longitudinal movement on a shaft and move the hoisting drum lengthwise of the shaft to engage a clutch member carried by the drum with a matching clutch member carried by the prime mover.

In describing our invention, as an illustration and not as a limitation, we will particularly illustrate and describe the same in connection with clutch means between a prime mover and a driven drum. However, it is to be expressly understood that our invention is not limited to such field of utility and the invention is applicable in other fields, as for example, as a brake means for a rotating member.

The above mentioned general objects of our invention together with others inherent in the same, are attained by the mechanism illustrated in the following drawings, the same being preferred exemplary forms of embodiment of our invention, throughout which drawings like reference numerals indicate like parts:

Figure 1 is a longitudinal sectional view, with parts shown in elevation, of an embodiment of our invention illustrating its use between a prime mover and a driven drum;

Fig. 2 is a view taken substantially on broken line 2—2 of Fig. 1 and with parts broken away;

Fig. 3 is a fragmentary sectional view taken substantially on broken line 3—3 of Fig. 2;

Fig. 4 is a fragmentary sectional view, not on the same scale as Fig. 3, taken substantially on broken line 4—4 of Fig. 2;

Fig. 5 is a detached view in plan, on a scale somewhat smaller than Figs. 3 and 4, of one of the friction blocks and taken substantially in the direction of the arrows on 5—5 of Fig. 1;

Fig. 6 is a fragmentary sectional view showing a modified form of the invention employing a driving shaft which is not longitudinally drilled;

Fig. 7 is a view similar to Fig. 4 showing a modified form of hydraulic plunger;

Fig. 8 is a fragmentary longitudinal sectional view, on a smaller scale, showing a modification of the mechanism shown in Fig. 1; and Fig. 9 is a perspective view of the friction blocks employed in Fig. 8.

In the drawings, a load is illustrated by the driven drum 10 which may be employed to wind a cable thereon. In view of the nature of our invention, the driven drum 10 need not move longitudinally of the shaft 11 which permits the use of non-friction bearings, as Timken thrust bearings 12. It was common practice heretofore to move the driven drum 10 and the clutch face connected therewith longitudinally of its supporting shaft, thus limiting the type of bearings which could be used to sleeve type bearings which were generally formed of brass.

The shaft 11 is thus freely rotatable as respects the driven drum 10 and is journaled in suitable bearings, one of which is illustrated by 13. The shaft 11 is fixed by key 42 to clutch member 22, which is connected by bull gear 8 to any suitable driven prime mover (not shown) and is illustrative of a driven rotary prime mover. A source of fluid under pressure provides the desired fluid pressure, as hydraulic pressure, and is illustrated by conduit 14 and connected with a tube-like opening 15 drilled longitudinally and centrally of the shaft 11. As the shaft 11 is illustrated as a rotating shaft, stuffing box means 16 prevents the escape of fluid and permits conduit 14 to remain at rest while shaft 11 rotates.

Fluid in the tube-like opening 15 in the shaft 11 connects with another tube-like opening 17 drilled radially of the shaft 11 and at right angles to the tube 15. An annular plenum chamber 18 is provided and the fluid from 14, 15 and 17 is connected therewith via conduits 19. In commercial operation we find it preferable to employ two conduits 19, although obviously one conduit 19 would interconnect the fluid with plenum chamber 18.

The type of structure shown in Fig. 1 is employed where a shaft, as shaft 11, may be longitudinally drilled. In many instances clutches will be employed in connection with shafts which cannot be longitudinally drilled, for example, in a ship the crankshaft of the motor may be drilled for oiling purposes of the motor and the driven shaft will connect to a propeller under water. Thus, the driven shaft cannot be drilled longitudinally, of its length.

Also, in many automobiles the crankshaft of the internal combustion motor is drilled for oiling purposes and the driven shaft will connect with rotary parts where drilling of the driven shaft is not practical. Under such circumstances the construction of Fig. 6 may be employed where a stuffing box 23, which is stationary, may be employed with a conduit 24 connected to a source of fluid under pressure. The stuffing box 23 and conduit 24 are stationary and the shaft 25 is a rotary shaft. Fluid from conduit 24 will enter chamber 9, thence pass through angular passageway 26 and thence pass to condit 19 and plenum chamber 18, which parts 19 and 18, are identical with the similarly numbered parts in Figs. 1 and 2. Thus, it is clear from the illustration of the invention in Figs. 1 and 2 and the illustration of the invention in Fig. 6 that our invention is not limited to conditions where either the driven or the driving shaft may be longitudinally drilled for passage of fluids.

A plurality of friction blocks 20, which are shown detached in Fig. 5, are of arcuate shape in plan (Fig. 5), and trapezoids in section (Figs. 3, 4 and 7), are employed to interconnect the clutch members 21 and 22, each of which clutch members is relatively longitudinally fixed, as of the shaft 11. Each friction block 20 is individually movable by fluid pressure from fluid passing through conduit 27 connected with the plenum chamber 18 and with a cylindrical chamber 28 which mounts a reciprocable piston 29. Each piston 29 is connected with a rod 30 which bears against and is preferably not secured to a friction block 20. Thus member 20 may move laterally without moving rod 30. This function thereof will be explained in connection with Fig. 5. One form of piston structure is shown in Fig. 4 where the fluid under pressure in chamber 28 urges the piston 29, rod 30 and block 20 away from clutch member 22 and toward clutch member 21 so that a block 20 engages in a suitably patterned recess 31 in clutch member 21. The type of structure shown in Figs. 1 to 4 provide members 28 and 29 operating at one side of the clutch member 22.

An alternative construction is shown in Fig. 7 where a block 32 similar to block 20 is employed, except the block 32 is drilled and a cylindrical chamber-forming means 33 is employed. The means 33 bears against and is preferably not secured to block 32. Also, space is provided for lateral relative movement of the block 32 as respects means 33. In the structure of Fig. 7 the cylinder forming means 33 moves relative a fixed piston 34 which is to be compared with the structure of Figs. 1, 2 and 4 where the piston 29 is movably mounted and the chamber 28, forming the cylinder walls for piston 29, is fixedly mounted. Thus, in Fig. 7, fluid under pressure entering conduit 27 passes into the chamber 35 above stationary piston 34 so that the cylindrical chamber-forming means 33 and the block 32 abutting the same may be moved to engage the walls of the recess 31 in clutch member 21.

Thus, by either positioning the block 20 abutting a rod carried by a movable piston or abutting the block 32 adjacent a cylinder forming member mounted for movement relative to a fixed piston, fluid under pressure from conduit 27 will cause the block 20 or 32 to move and frictionally engage the side walls of the annular recess 31 in the clutch member 21.

In order to mount a block 20 or 32 so the same will be normally in non-engaging position, each clutch member is supported near its ends by the spring loaded structure of Fig. 3. The spring loaded structure of Fig. 3 provides for spring means to release the clutch (i. e., move the block 20 or 32 toward its clutch member 22) in the absence of fluid pressure in a conduit 27 and also functions as a centering device. A bolt 36 is slidably mounted in an opening 36' in clutch member 22. The friction blocks 20 are provided with openings 38 so the bolt 36, washer 40 and key 41 may be disposed therein. Thus, as the block 20 moves away from clutch member 22 and into clutch engaging position, washer 40, key 41, bolt 36, nut and washer means 37 are likewise moved and spring 39 is compressed. The nut and washer means 37 are disposed so they can be readily adjusted. While bolt 36 may be directly secured to a block 20 and sufficient space may be provided between openings 36' and bolt 36 for side play, we prefer the construction shown.

Each block 20 is provided with a plurality of springs 39 to retract the same. Thus, the forward and trailing ends of each block may have a different spring tension tending to retract the block. Preferably the forward end has the greatest spring tension for smoothness of engaging and disengaging the clutch.

In order to provide self-aligning of the wedge-shaped arcuate blocks 20 or 32 into mating openings 31, the openings 38 in the blocks 20 or 32 are out of round (see Fig. 5) so that each block may move sidewise—note as 30 is not connected to block 20 and 33 is not connected to block 32, such members 30 and 33 do not restrict lateral movement. Ample room is provided between the parts carried by the bolt 36 and the block 20 or 33 and the block 32 adjacent said parts to permit turning movement of each block 20 or 32. As the construction of Figs. 3 and 5 is identical regardless of whether block 20 or 32 is employed the showing is not repeated for block 32. Thus, in the event that the blocks 20 or 32 do not positively center in the openings 31 in the clutch member 21 sufficient lateral movement of the blocks 20 or 32 is permitted to provide for self-centering.

An alternative form of the invention is shown in Figs. 8 and 9 where the novel features are attached to fragmentary parts of Fig. 1 to thus incorporate the various common features, as a driven shaft 11 having key means 42 to secure a clutch part thereto, opening 17, conduits 19, plenum chamber 18, conduits 27, chamber 28, piston 29, rod 30 and bull gear 8. The novel features over the earlier figures includes a driving clutch member 46 which corresponds to member 22 and differs therefrom in that the clutch blocks 47 are projected radially instead of axially or at right angles to the clutch member. The clutch member 43 corresponds to clutch member 21 and has an annular recess 45 coaxial with the shaft 11 to receive individual blocks 47. Thus the blocks 47 are moved radially to engage the groove 45, as by the fluid pressure means of Fig. 4, and are returned to a neutral position by the means of Fig. 3. As best shown in Fig. 9, the blocks 47 to match the groove 45 will be arcuate in elevation and trapezoidal in section. Also the clutch member 43 carried a driven load, as drum 44 which corresponds to the driven drum 10 of the earlier figures.

From the foregoing description of our invention, it is apparent that we provide two rotatable clutch members 21 and 22 or 43 and 46 which are in spaced relation, either axially or radially and each is longitudinally fixed. Also, it is apparent that we provide individually actuated blocks or friction members 20 or 32, which are of arcuate shape in plan and wedge shaped or trapezoidal in section. Also, is provided the individual blocks 47 which are of arcuate shape in elevation and of similar shape in section as blocks 20 or 32. These friction members 20 or 32, or 47, are carried by one of the clutch members, as 22 or 46, and they may be moved either axially or radially into frictional engagement with walls of a friction surface, as an annular recess or groove 31 or 45, carried by another clutch member, as 21 or 43. This permits each of the clutch members to be mounted with any suitable type of bearings on a supporting shaft and also provides for individual engagement of various friction members so that warpage of either of the clutch members will not limit the extent of the engaged friction surfaces. Also, it is apparent from our invention that the blocks 20 are loosely supported, permitting lateral play, by the means best shown in Fig. 3 to permit self-aligning action of blocks 20 or 32, or 47, within a recess 31 or 45. Also, there is provided a fluid pressure plenum chamber carried by the clutch member carrying the friction members and such source of fluid pressure is connected to the actuating means for each friction member. The actuating means may comprise a moving piston and stationary walls as in Fig. 4 or a stationary piston and moving walls as in Fig. 7. Also, the shaft, as 11, may be longitudinally drilled as in Fig. 1, or an angular passageway and stuffing box means may be employed, as in Fig. 6.

Obviously, changes may be made in the forms, dimensions and arrangement of the parts of our invention, without departing from the principle thereof, the above setting forth only preferred forms of embodiment.

We claim:

1. In a device of the class described, a rotatably mounted driving member; a rotatably mounted driven member axially aligned and in spaced relation to said driving member, said driving and driven members being fixed against movement toward and away from each other; a plurality of radially positioned friction members of trapezoidal shape in section; mounting means individually mounting each friction member on said driving member, said mounting means comprising means at each end portion limiting lateral movement within predetermined limits; a grooved annular friction surface carried by said driven member; and fluid pressure operated means for each of said friction members individually moving said friction members into engagement with the said friction surface of the driven member, whereby the friction members may angularly move while being urged into said grooved annular friction surface and will thereby tend to align therewith.

2. In a device of the class described, a rotatably mounted driving member; a rotatably mounted driven member axially aligned and in spaced relation to said driving member, said driving and driven members being fixed against movement toward and away from each other; a plurality of radially positioned friction members of trapezoidal shape in section; mounting means individually mounting each friction member on said driving member; a grooved annular friction surface carried by said driven member; and fluid pressure operated means for each of said friction members individually moving said friction members into engagement with the said friction surface of the driven member, whereby the friction members may angularly move while being urged into said grooved annular friction surface and will thereby tend to align therewith.

3. In a device of the class described, a rotatably mounted driving member; a rotatably mounted driven member axially aligned and in spaced relation to said driving member, said driving and driven members being fixed against movement toward and away from each other; a plurality of radially positioned friction members of trapezoidal shape in section; mounting means individually mounting each friction member on said driving member, said mounting means comprising spring means urging each friction member toward the driving member and spring adjusting means positioned external of the driving member; a grooved annular friction surface carried by said driving member; and fluid pressure operated means for each of said friction members individually moving said friction members into engagement with the said friction surface of the driven member, whereby the friction members may angularly move while being urged into said grooved annular friction surface and will thereby tend to align therewith.

DONALD O. MacDONALD.
ROBERT T. MacDONALD.
CHARLES KENNETH MacDONALD.

REFERENCES CITED

The following references are of record in the file of this patent:

UNITED STATES PATENTS

| Number | Name | Date |
|---|---|---|
| 504,110 | McConnell | Aug. 29, 1893 |
| 574,823 | Richards | Jan. 5, 1897 |
| 2,176,468 | Morin et al. | Oct. 17, 1939 |
| 2,256,258 | Flecksinger | Sept. 16, 1941 |